April 11, 1944.  J. R. GRANT  2,346,161
MEANS FOR ENCASING EGGS
Filed April 16, 1941  7 Sheets-Sheet 1

INVENTOR.
Jesse R. Grant
BY George H. Simmons
ATTORNEY.

April 11, 1944.   J. R. GRANT   2,346,161
MEANS FOR ENCASING EGGS
Filed April 16, 1941   7 Sheets-Sheet 2

INVENTOR.
Jesse R. Grant
BY George H. Simmons
ATTORNEY.

April 11, 1944.                J. R. GRANT                2,346,161
                         MEANS FOR ENCASING EGGS
                          Filed April 16, 1941          7 Sheets-Sheet 4

INVENTOR.
Jesse R. Grant
BY George H. Simmons
ATTORNEY.

April 11, 1944.　　　J. R. GRANT　　　2,346,161
MEANS FOR ENCASING EGGS
Filed April 16, 1941　　7 Sheets-Sheet 5

INVENTOR.
Jesse R. Grant,
BY George H. Simmons
ATTORNEY.

April 11, 1944.  J. R. GRANT  2,346,161
MEANS FOR ENCASING EGGS
Filed April 16, 1941  7 Sheets-Sheet 6

INVENTOR.
Jesse R. Grant
BY George H. Simmons
ATTORNEY.

April 11, 1944.    J. R. GRANT    2,346,161
MEANS FOR ENCASING EGGS
Filed April 16, 1941    7 Sheets-Sheet 7

INVENTOR.
Jesse R. Grant
BY George H. Simmons
ATTORNEY.

Patented Apr. 11, 1944

2,346,161

UNITED STATES PATENT OFFICE 2,346,161

MEANS FOR ENCASING EGGS

Jesse R. Grant, Chicago, Ill.

Application April 16, 1941, Serial No. 388,728

8 Claims. (Cl. 217—26.5)

This invention relates to means for encasing eggs in a standard egg case in individual pockets, which means is adapted for encasing the eggs for delivery to both the wholesale and retail trade.

It is a main object of the invention to provide an egg encasing means composed of two component parts that are accurately registered and securely fixed together to provide between them the sole cushioning means needed in the egg case to protect the eggs from jars imparted to the case from any direction.

It is a further object of the invention to provide an egg encasing means composed of two component parts that are readily separable to permit commercial handling of the eggs in accordance with established practices for candling, grading and inspection.

A further object of the invention lies in the provision of an egg encasing means which provides a maximum of egg space in the case, thereby permitting the packing of large eggs without danger of end crushing.

Still another object of the invention lies in the provision of an egg encasing means which provides improved cross ventilation of the eggs in the case, thereby to minimize the shrinkage of the eggs in storage.

Still another object of the invention lies in the provision of an egg encasing means arranged to permit a maximum inspection of the eggs with a minimum of handling thereof, thereby lessening the loss in quality of the eggs occasioned by extra handling.

Further objects of the invention, not specifically mentioned here, will be apparent from the detailed description and claims which follow, reference being had to the accompanying drawings in which:

In the handling of eggs from the sources of supply on the farms to the consumers, a packer or shipper, located near the source of supply, buys eggs from day to day from the farms, from local stores and from hucksters. These current receipts of eggs are worked over by the packer who grades them and packs the graded eggs in standard egg cases which are composed of wood or corrugated paper and hold thirty dozen eggs per case. To protect the eggs in the case, so-called "fillers and flats" are used, the fillers and flats shown in my prior Patent Number 2,216,193, issued October 1, 1940, being now extensively used for this purpose. The packer refrigerates the cased eggs until 400 cases are at hand and then ships them to market in a consuming or distributing center, usually in a city, in a refrigerated car.

Upon arrival at the market, the car of eggs is inspected, candled and graded to determine its value, this grading usually being done either by graders representing a prospective purchaser of the eggs or by an official grader representing the mercantile or produce market through which the packer is selling the eggs. After the eggs are bought on this market, usually by a wholesaler, all of the cases in the car are worked over by the wholesaler's graders who regrade the eggs in accordance with the particular standards of the wholesaler. The graders repack the eggs in cartons for the retailers who buy from the wholesaler, discarding the fillers and flats from the cases and often times repacking the cases with cartons. The wholesaler, during a portion of the year, may place a large portion of the regraded eggs in cold storage for sale to the retailers during the part of the year when the production of eggs on the farm is low.

This handling and rehandling of the eggs has developed many practices known as "commercial handling," and any device for encasing the eggs in a case must permit such "commercial handling," otherwise the device will not go into general use. In this commercial handling, graders pick up two eggs in each hand when candling and three eggs in each hand when grading and inspecting and when transferring the eggs from one container to another. When transferring from one case to another, eggs are handled three dozen at a time, that is, the filler and flat are handled as a unit.

As is well appreciated by those skilled in the art, the quality of an egg is impaired somewhat each time the egg is handled and in an effort to reduce the number of times an egg must be handled, it has been attempted heretofore to pack the eggs at the packers at the source of supply in retail cartons which have been placed in standard egg cases for shipment to the markets. These efforts have not gone into general practice for the reason that the cartons heretofore available have embraced so much of the eggs that commercial handling at the market has been impossible.

The present invention seeks to provide a means for encasing eggs for the retail trade which can be packed by the shipper at the source of supply; which permits commercial handling of the eggs at the market in grading a shipment to determine price; and which eliminates the necessity of working over and retail packing of the shipment by the wholesaler.

Another objection to retail packing of eggs at the source of supply arises from the fact that no retail carton now available can be used to encase eggs in cold storage. The quality of eggs is impaired if too long a time is consumed in bringing the eggs to storage temperatures and humidity and the cartons now available do not permit sufficient circulation of air around the eggs for successful storage. Furthermore, none of the cartons available is capable of withstanding without damage the humid atmosphere necessary for the storage of eggs. Eggs must be rehandled when removed from storage and present cartons do not permit commercial handling at this time. The egg encasing means of the present invention provided for improved cross-circulation of air around the eggs for better storage conditions, is capable of standing storage humidities without damage, and the eggs can be commercially handled when removed from storage.

By providing an egg encasing means into which eggs placed by the packer at the source of supply may remain until finally removed by the consumer, the invention eliminates the practice of re-using the fillers and flats discarded by the wholesaler and consequent impairment of the quality of eggs occasioned by the use of soiled fillers and flats. The wholesaler is relieved of the necessity of buying cartons for the retail packing of his product.

In accordance with the teachings of the present invention, the means for encasing the eggs in individual pockets in the case is designed so as to afford ample protection for the eggs in transit and so as to permit exposure of a sufficient portion of the egg to permit commercial handling of the same at the market. In one embodiment of the invention, the egg encasing means is arranged as a carton containing one dozen eggs which carton nests in the standard egg case with fourteen other cartons to permit packing fifteen dozen in each section of the case.

In another embodiment of the invention, the egg encasing means is formed as a filler and a flat, which filler and flat are both separable to form cartons containing either one-half dozen eggs, one dozen eggs, or one and one-half dozen eggs as may be required. The filler and flat, because they can be cut apart to form a smaller unit, can form the egg protecting portion of the carton in which the eggs are delivered, first to the retail merchant and subsequently to the consumer. For convenience, the filler and flat may be formed of molded material, such as newsboard pulp or wood pulp suitably scored so as to permit ready separation of the members to form the carton for a lesser number of eggs. The teachings of the invention may also be applied to a carton formed of calendered paper stock in the manner of the present cartons and adapted to fit in a standard egg case so as to permit packing the usual number of eggs therein.

Figure 1:
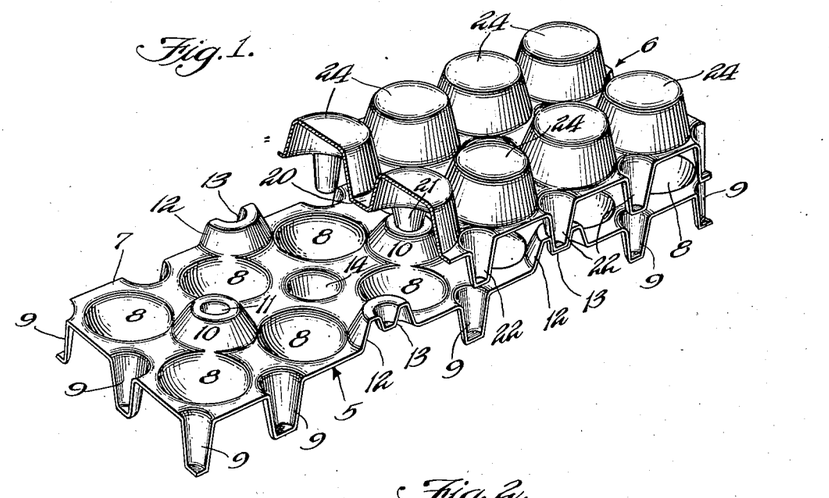
Figure 1 is a perspective view of the two complementary parts of the egg encasing means nested together with part of one member cut away, the better to show the details of construction.
Figure 2:
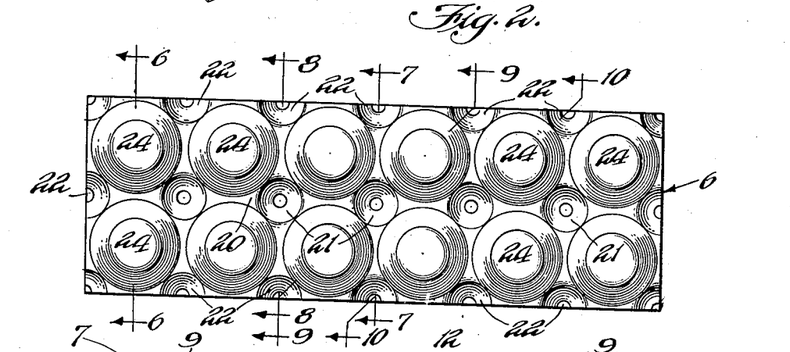
Figure 2 is a top side plan view of the upper one of the two complementary parts.
Figure 11:
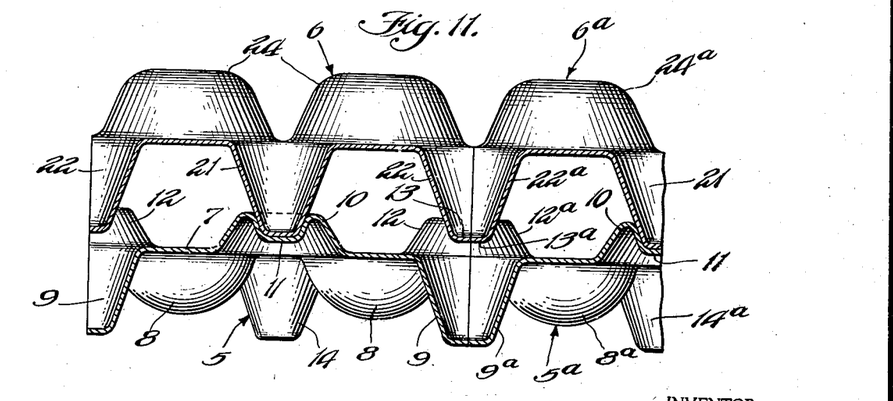
Figure 11 is a cross-sectional view through adjacent cartons along the same line as 7—7 and showing particularly the manner in which adjacent cartons fit together.
Figure 12:
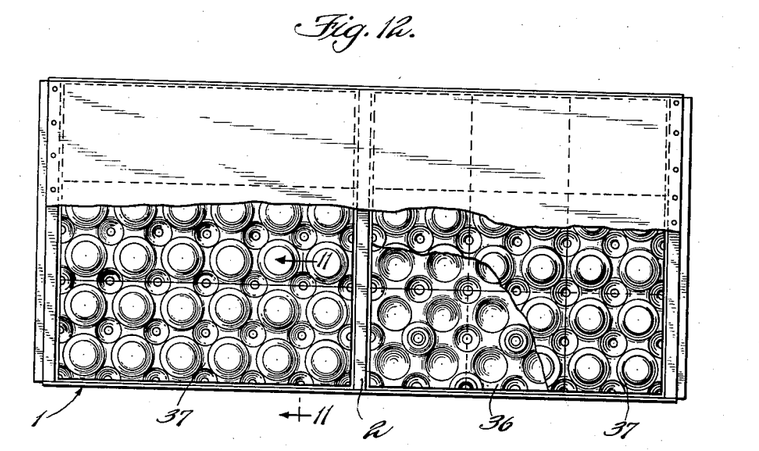
Figure 12 is a plan view of an egg case with the egg encasing means therein and with parts broken away, the better to show the construction.
Figure 13:
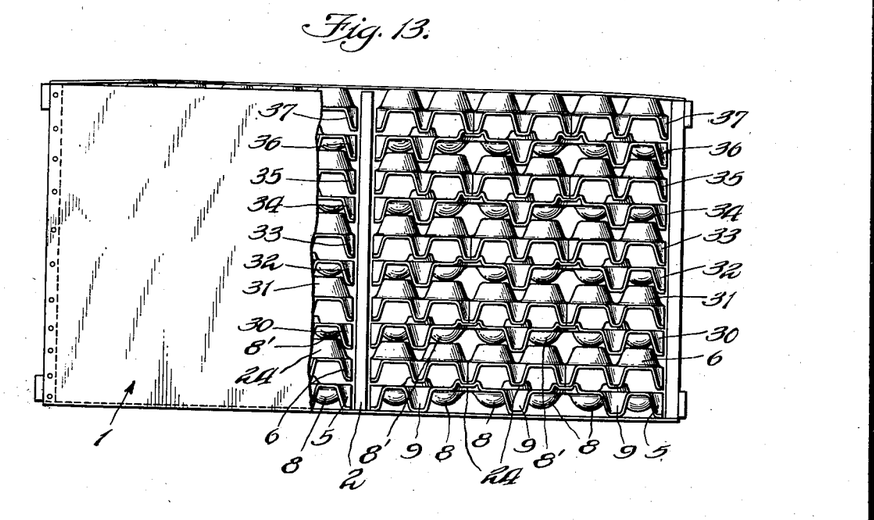
Figure 13 is an elevational view of the egg case with part of the front wall broken away to show the egg encasing means therein.

Referring now to the drawings in more detail, particularly Figures 1 to 13 inclusive, the standard egg case 1, Figures 12 and 13, is divided into two sections by a central wall 2, each section being substantially square and somewhat deeper than the length of one side of the square section; each section is adapted to receive fifteen dozen eggs. Standard cases of this kind are composed of wood or corrugated paperboard and either type of case may be used within the teachings of the invention, although a wooden case is shown by way of example. It will be seen in Figure 1 the egg encasing means consists of a bottom member 5, for convenience herein referred to as the flat, and a complementary top member 6, for convenience herein referred to as the filler. The flat 5, here shown, consists of a generally planar member 7 containing a plurality of downwardly extending cavities 8 arranged in two rows with six cavities in each row. Around the outer edge of the member 7 are downwardly depending feet 9 which are adapted to rest upon the bottom of the egg case and to support the flat thereabove. As will be seen best in Figures 4 to 11, the feet 9 extend below the planar portion 7 a greater distance than do the cavities 8 so that when eggs are placed in the cavities of the flat whose feet rest against the bottom of the case 1, those eggs will be supported above the bottom of the case and thereby protected from injury.

Figure 7:
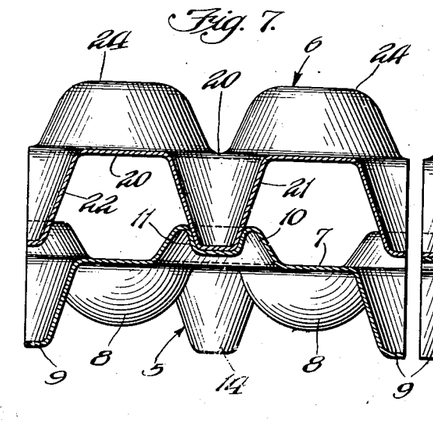
Figure 7 is a cross-sectional view between adjacent egg pockets showing particularly the center supporting means and taken substantially along the line 8—8 of Figure 2, looking in the direction of the arrows.

Rising out of the planar portion 7 of the flat along the longitudinal median line thereof and between the two rows of cavities 8 are bosses 10 which contain sockets 11 depending into their upper free faces, as will be best seen in Figure 7. Three such bosses 10 are provided in the flat 5, as will be seen in Figure 3.

Rising out of the planar portion 7 and along the edges thereof are similar bosses 12, each of which bosses is shaped substantially as a half section of a conical frustum. Each of the bosses 12 contains a depression 13 depending from its upper free face and forming one-half of a socket. As will be seen in Figures 1 and 3, four bosses 12 are provided.

Depending from the planar portion 7 of the flat 5 and along the median line thereof and midway between adjacent ones of the bosses 10 are feet 14 which extend downwardly and terminate in the same plane as the feet, nine of which feet 14 are shown shaped as a frustum of a cone although other shapes are contemplated.

Figure 3:
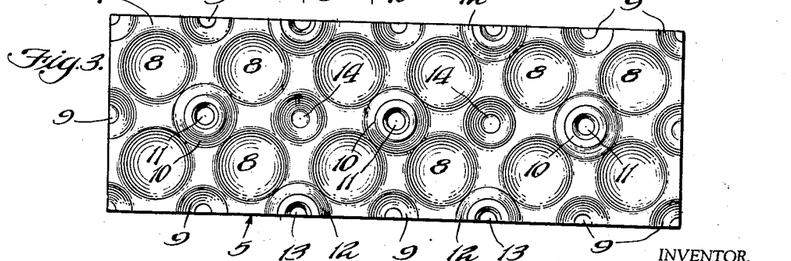
Figure 3 is a top side plan view of the lower one of the two complementary parts.
Figure 4:
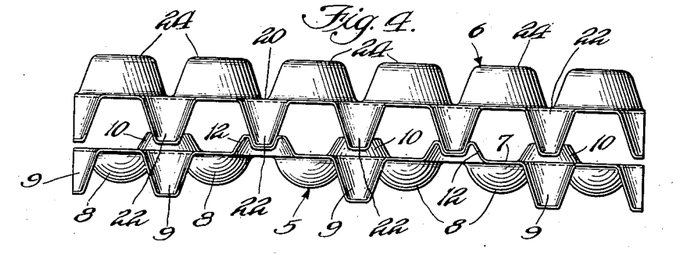
Figure 4 is a side elevational view of the device shown in Figure 1.
Figure 5:
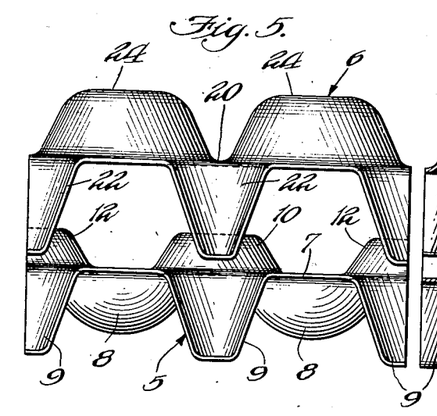
Figure 5 is an end elevational view.
Figure 6:
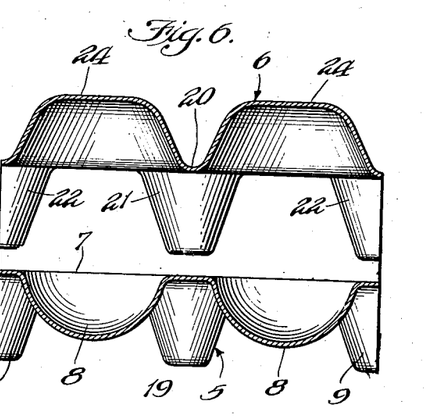
Figure 6 is a cross-sectional view through the egg pockets, taken substantially along the line 6—6 of Figure 2, looking in the direction of the arrows.
Figure 8:
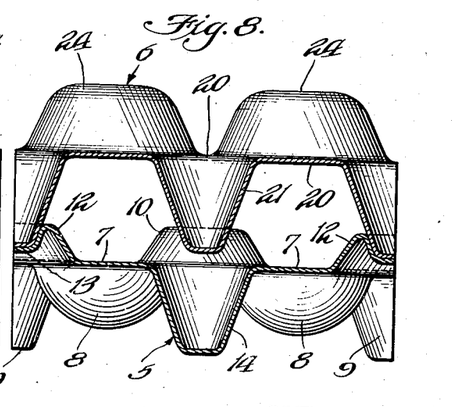
Figure 8 is a view similar to Figure 7 showing particularly the side supporting means and taken substantially along the line 8—8 of Figure 2, looking in the direction of the arrows.
Figure 9:
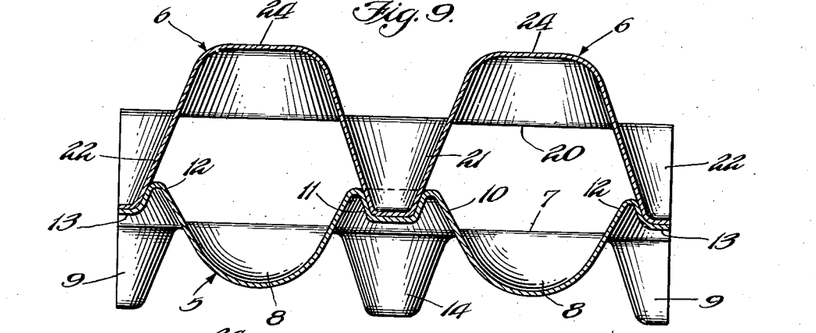
Figure 9 is a cross-sectional view along the diagonal line 9—9 of Figure 2, looking in the direction of the arrows.
Figure 10:
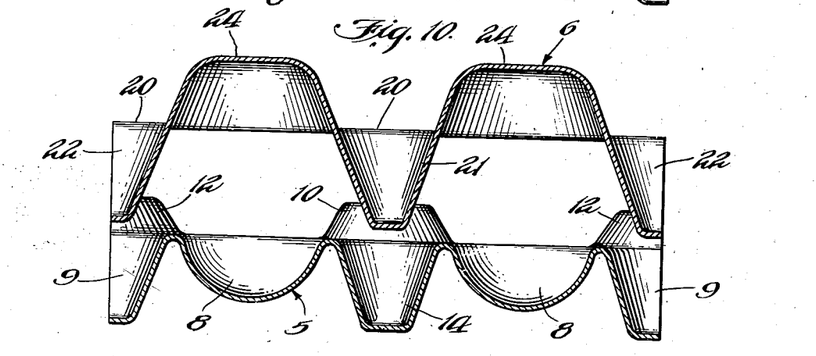
Figure 10 is a cross-sectional view along the diagonal line 10—10 of Figure 2, looking in the direction of the arrows.

By this construction, as will be seen in Figure 3, the four pockets 8 at the left hand end of the carton, are supported by three feet 9 and one foot 14 depending below the pocket and have one boss 10 extending upwardly at the central point of the group of four pockets. The middle group of four pockets 8 is supported by two feet 14 on the median line of the flat and by two feet 9 on the edges thereof, this group of four pockets likewise having a boss 10 extending upwardly from the center point of the group. The right hand group of four pockets is supported the same as the left hand group. Bosses 12 extend upwardly along the edge of the flat and are aligned transversely with the feet 14 so that a section through the flat along the line 8—8, as shown in Figure 8, begins with an upwardly extending boss 12, drops down to the planar portion 7 and then drops again through the foot 14, returns to the planar portion 7 and thence upwardly and terminates in the boss 12 on the opposite side of the flat.

As will be seen in Figures 1, 2 and 4 to 11 inclusive, the upper complementary member 6 consists of a planar portion 20 from which, along the median line of the member, a plurality of feet 21 depend downwardly, three of these feet registering with the bosses 10 and fitting into the sockets 11 therein. Along the outer edge of the planar portion 20 of the member 6 are a plurality of feet 22, each of which is shaped as a half of a conical frustum. Four of these feet 22 register with the bosses 12 in the flat 5 and extend into the sockets 13 therein. The feet 22 thereby aid feet 21 in positioning and holding the member 6 with respect to the member 5.

Rising out of the planar portion 20 are a plurality of inverted cavities 24 which are arranged in rows, six in a row, and adapted to be disposed immediately above the cavities 8 in the flat 5 when the feet 21 and 22 are registered with the corresponding bosses in the flat. The cavities 8 and 24 together form a pocket which is sufficiently high to accommodate the longest egg likely to be encountered and is sufficiently wide to accommodate the widest egg likely to be encountered. The planar portions 7 and 20 of the flat and filler are spaced apart, leaving open spaces 25 between the depending feet 22 on the filler and corresponding open spaces 26, Figures 7 and 8, between adjacent feet 21 and between feet 21 and 22, so that air may circulate freely into the carton and around the eggs. Feet 21 and 22 are positioned so as to serve as posts which prevent the egg from falling out of the pocket even though the egg is neither long enough to engage the top and bottom portions of the pocket nor wide enough to engage the sides thereof. Since the height of the pocket is greater than the average length of the eggs, none but the longest eggs will touch both the top and bottom walls of the pockets.

The filler and flat 5 and 6 are long enough to fit into the section of a case 1, Figures 12 and 13, leaving a small amount of clearance space at the end of these members and have a width slightly less than one-third of their length so that when three of the members are laid side by side in the bottom of the case, there will be a small amount of space around the members on all sides. As will be seen in Figure 13, the feet 9 rest upon the bottom of the case and support the bottom cavities 8 of the pockets off of the bottom of the case. The lowermost filler 6 rests securely down upon the bottom flat 5. A second flat 30 which is of construction identical to the flat 5 is disposed upon top of the filler 6 with the bottoms of the cavities 8' in the flat 30 resting squarely upon the tops of the inverse cavities 24 in the filler 6. A second filler 31 is registered with and fitted upon the flat 30 in the same manner as filler 6 fits on flat 5. A third flat 32 is brought to rest upon the filler 31 and its filler 33 registered with it in the same manner. A fourth flat 34 rests upon the filler 33 and has a companion filler 35 registered therewith. A fifth flat 36 rests upon the filler 35 and a fifth filler 37 is registered with the flat 36. When thus stacked up, the fillers and flats extend a short distance above the top of the case so that when the lid is nailed on, the fillers and flats will be compressed slightly so as to securely bind them in the case. The height of the pockets formed by the fillers and flats is sufficient that this compression will not put pressure directly upon the end of the eggs even though five layers of long eggs are thus stacked one above the other and end crushing of the eggs is avoided. There is sufficient give in the fillers and flats so that the pressure is distributed laterally as well as vertically as the lid is being nailed on. Each section of the egg case is thus filled with fifteen fillers and flats arranged in pairs forming cartons, each of which contains one dozen eggs. It is standard practice in closing a standard wooden egg case to nail the cover only at the ends and not to nail the cover to the partition 2. The cover is thus bowed slightly, as indicated in Figure 13, so that the strain put on the fillers and flats is not entirely vertical.

As will be seen best in Figure 11, when fillers and flats 6 and 5 are stacked alongside of an adjacent filler and flat 6a and 5a, as shown in Figure 13, feet 9 of the flat 5 are registered with feet 9a of the flat 5a and together form a foot that is of substantially the same shape as foot 14. Feet 22 of the filler 6 register with feet 22a of the filler 6a and together form feet of the same general shape as feet 21. Bosses 12 of flat 5 and bosses 12a of flat 5a fit together and the recesses 13 and 13a therein together form sockets into which the feet 22 and 22a are registered.

It will be noted that the filler 6 is locked against transverse or longitudinal movement with respect to the flat 5 by the engagement of the feet 21 with the sockets 11 in the bosses 10 and by the engagement of the feet 22 with the sockets 13 in the bosses 12. Since the flat 30 in the second layer of eggs in the case is supported upon the filler 6 of the first layer by the engagement of the bottoms of the cavities 8' with the tops of the inverse cavities 24 of the filler 6, the feet of the flat 30 will extend down alongside the outside surface of the inverse cavities 24 so as to lock the second flat with respect to the first filler. Feet 14 of the flat 30 likewise extend down into the space between the outside surfaces of the inverse cavities 24 of the filler 6 to aid in resisting movement of the flat 30 transversely and longitudinally with respect to the filler 6. Thus it will be seen that the stacking of the fillers and flats, one above the other in the case, builds up a structure which is solid and capable of resisting impacts placed on the case along transverse or longitudinal lines through it.

When the fillers and flats are stacked one above the other, there is a double thickness of material between the vertical rows of eggs instead of the single thickness of the fillers and flats shown in the above mentioned Patent No. 2,216,193. The top portion of the inverse cavity 24 of the lower layer and the bottom of the cavity 8' of the next layer both extend between the eggs in those layers. These fillers and flats, being composed of material having some give, will cushion long eggs so that when such eggs are stacked one on the other, end crushing of the eggs is decreased. Shorter eggs will not touch the top of the pockets in which they are encased and additional cushioning results.

When the case arrives at the market and is opened for inspection, the top filler 37 may be readily removed from its flat 36 to expose the eggs in the flat 36 and if none of these eggs is broken and they are not to be rehandled, the flat with its eggs can be readily removed from the case and the filler replaced on it. Although the filler and flat are secured together sufficiently tightly to insure safe shipment of the eggs in the case, additional securing means must be provided to form a safe carton for delivery of the eggs to the consumer. If desired, a band of paper or other suitable material may be wrapped around the filler and flat and secured in any preferred manner, such as by pasting, to form a sealed carton for delivery of the eggs to the consumer. If the eggs are being sold under trade names, this band may conveniently contain such identifying data. Other methods of securing the filler and flat together to form a safe carton are contemplated within the teachings of the invention.

The carton thus formed is convenient for the housewife. The carton has a flat top so that when stored in the home refrigerator other articles may be placed on top of it if desired. The open spaces around the carton provide for ample ventilation so it is not necessary to remove the eggs from the carton before placing them in the refrigerator. If desired, the filler portion of the carton can be removed and only the flat used to store the eggs. This can be safely done since the eggs are securely supported in upright position. Since the eggs are in upright position in the carton and since a major portion of the egg is exposed when the top of the carton is removed, the housewife can remove the eggs from the carton more conveniently than is possible with the cartons of the prior art.

In the event that the eggs are to be re-candled, tap tested or graded at the market, as will usually be the case, commercial handling of the eggs in accordance with long established practices may be followed. When the filler is removed from the flat, the eggs are secured in upright spaced apart relation by their position in the cavities 8 in the flat 5. These cavities are formed of sufficient depth to securely support the eggs in upright position and at the same time are shallow enough to leave exposed a sufficient portion of the egg to permit the workmen to handle it in the customary manner. It has been found that if the depth of the cavities 8 is such that approximately one-quarter of the egg is encased therein and three-quarters of the egg is extending above the planar portion 7 of the flat, commercial handling is possible. While this one-quarter and three-quarter relation has been found to be satisfactory, the precise proportions may be changed within the teachings of the invention to have a greater or lesser portion of the egg encased in the cavities 8. So long as a sufficient portion of the egg is so encased to insure holding the egg in upright position, the teachings of the invention are fulfilled and so long as a sufficient portion of the egg is exposed to permit the workmen to pick up the required number of eggs for commercially handling the same in accordance with established practice, the teachings of the invention are likewise fulfilled and the precise proportions of exposed and concealed parts of the egg may be varied. Bosses 10 and 12 project above the planar portion 7 of the flat but it has been found that these bosses may extend above this planar portion a sufficient distance to enable them to perform the function intended without interfering with the commercial handling of the eggs in the flat.

The egg encasing means thus far described have consisted of fillers and flats, each containing cavities for receiving one dozen eggs so that the filler and flat combined form a carton of the size usually used in the retail handling of eggs. The teachings of the invention may equally well be applied to fillers and flats of larger dimension. In Figures 16 to 19 inclusive, there is shown a filler and flat each containing cavities for 36 eggs and each of such dimension as to fit into one section of a standard egg case in the same manner as the fillers and flats of the prior art. This form of flat is shown in detail in Figure 18 wherein the flat 41 contains a planar portion 42 from which cavities 43 depend downwardly, there being thirty-six cavities 43. Around the edge of the flat 41 are downwardly depending feet 44 which feet are located on all four sides of the flat. On each of two sides of the flat and between adjacent ones of the feet 44 are bosses 45 which project upwardly from the planar section 42 of the flat and terminate in a socket 46.

Located between the rows of cavities 43 are downwardly depending feet 47 and upwardly extending bosses 48 each of which bosses terminates in a socket 49. It will be noted that this combination of cavities, feet and bosses, is the same as heretofore described in connection with Figure 1.

Figure 16:
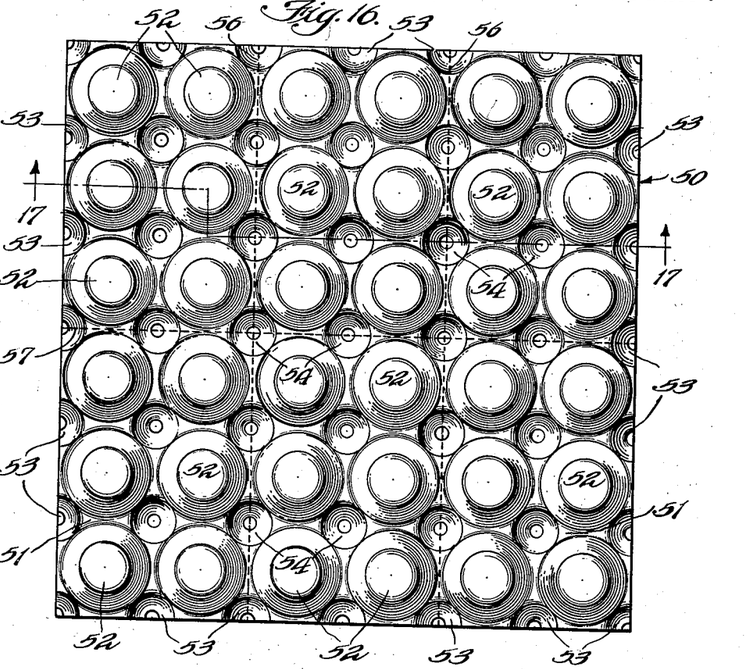
Figure 16 is a top side plan view of the top one of the complementary sections of the egg encasing means formed as a filler adapted to fit in a standard egg case and showing lines along which the filler may be separated to form smaller cartons.
Figure 17:
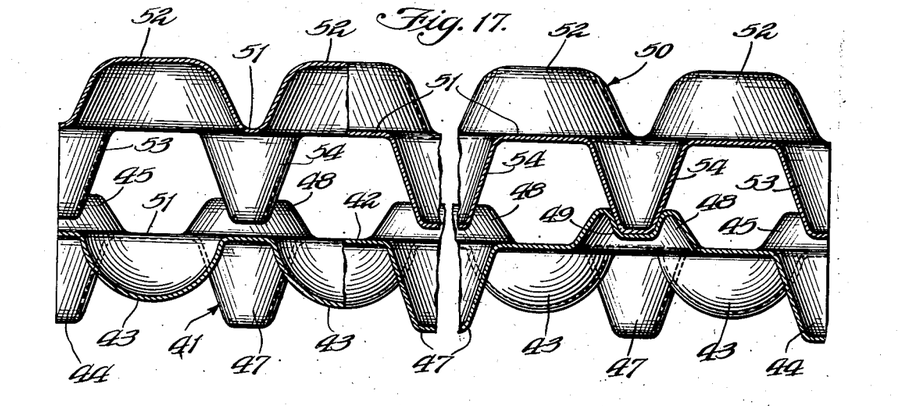
Figure 17 is a cross-sectional view taken substantially along the line 17—17 of Figure 16, looking in the direction of the arrows.

As will be seen in Figures 16 and 17, the filler 50 has a planar portion 51 with inverse cavities 52 extending upwardly therefrom and with feet 53 depending downwardly therefrom on all four edges of the flat and with similar feet 54 depending from the planar portion between the rows of inverse cavities 52. Cavities 52 are positioned so as to register with the cavities 43 in the flat when the feet 53 and 54 of the filler are registered with the bosses 45 and 46 respectively of the flat.

Figure 18:
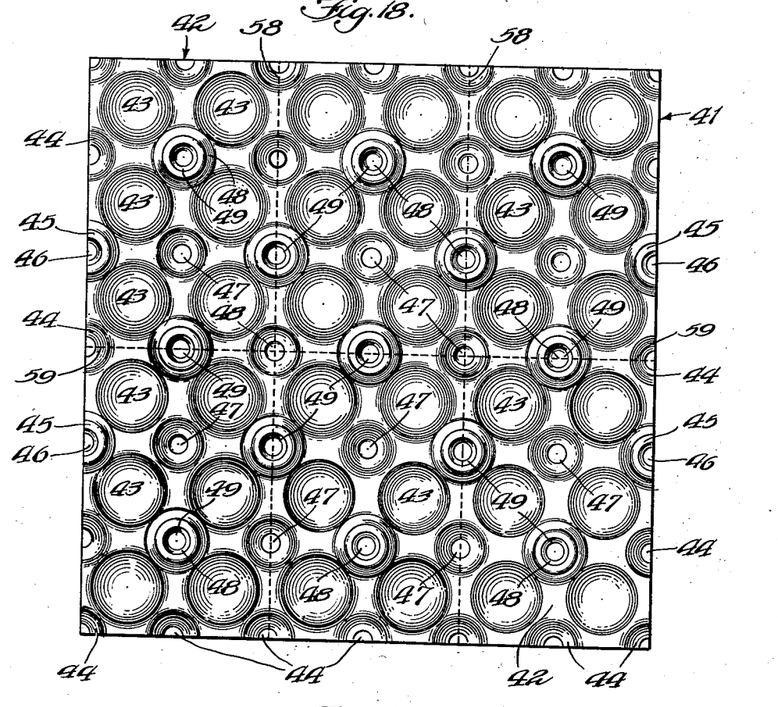
Figure 18 is a top side plan view of the bottom one of the two complementary sections of the egg encasing means formed as a flat adapted to fit into a standard egg case and showing lines of separation to form a carton.
Figure 19:
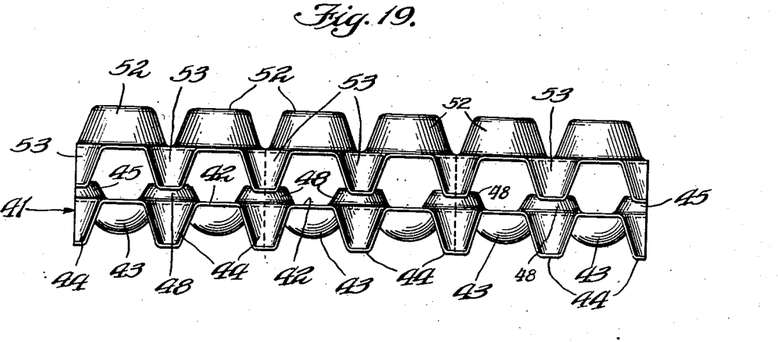
Figure 19 is an end elevational view of the filler and flat shown in Figures 16 and 18.

The size of the configuration of the cavities in the filler and flat shown in Figures 16 to 18 inclusive is the same as heretofore described. Thirty-six eggs may be supported in individual pockets within the filler and flat and cross-ventilation of the eggs is secured through the open spaces 55 between the feet on the filler and planar surface of the flat.

In order to permit the produce merchant to separate the filler 50 and the flat 41 so as to form cartons, the filler is scored as shown at 56 in Figure 16. When separated along these scored lines, the filler forms three complementary carton members, each adapted to contain a dozen eggs. The filler may also be provided with a transverse score line 57 so that each of the three complementary sections formed by separating the filler along the scores 56 may be divided by separating along the scores 57 thereby to form the filler into six portions each adapted to receive one-half dozen eggs. Should it ever be desirable to form cartons containing one and one-half dozen eggs, the filler 50 may be separated along the score 57, leaving the score 56 intact thereby separating the filler into two sections, each containing eighteen cavities.

As will be seen in Figure 18, the flat 41 is provided with scores 58 which correspond to scores 56 in the filler and with a score 59 which corresponds to the score 57. By separating the flat along these scores, it may be divided into sections containing six, twelve or eighteen cavities, the same as the filler.

The fillers 50 and flats 41, when fitted together, are locked so as to withstand greater side thrusts than the fillers and flats of the prior art. When stacked one on top of the other in the manner shown in Figure 13 for fillers and flats 6 and 5, the stack is locked together and may be handled as a unit without difficulty. The fillers may readily be removed leaving the eggs securely held upright though readily accessible for handling. The so-called "hooks" now used to pick up the thirty-six eggs on a flat for processing may be used without difficulty. The flat and eggs may be lifted out of a case as a unit as readily as can the flats of the prior art, and should an egg be broken, it will not run out of the flat and soil other eggs in the case. When composed of molded pulp, the fillers and flats cost little more than the present fillers and flats and cost less than the filler flat carton combination now used for the retail packing of eggs. The improved fillers and flats may be fabricated from paper stock and though somewhat more expensive when so fabricated may be no more expensive than the filler flat carton combination now used.

The improved means for encasing eggs of the present invention lends itself well to the growing practice of shipping eggs in small quantities directly to the consumer by parcel post. In this practice heretofore shippers and farmers have provided themselves with metal or fibre cases containing one, two or three dozen eggs in which cases standard fillers and flats have been used and the package shipped by parcel post. The customer is supposed to return the case to the shipper but it has been found that they frequently neglect to do so with the result that in order to maintain this service, the shipper must provide himself with a large number of these relatively expensive shipping cases.

Figure 14:
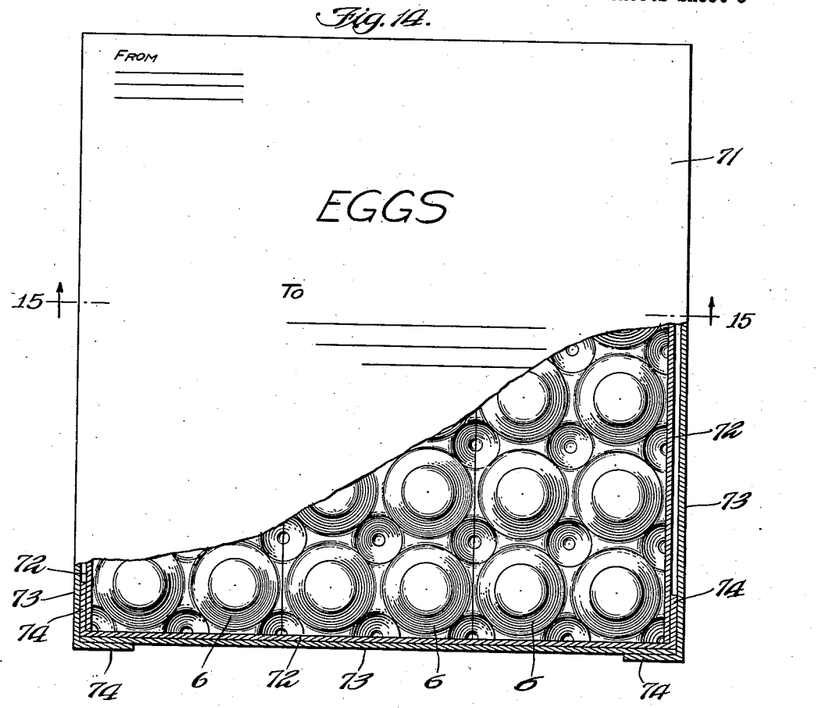
Figure 14 is a cross-sectional view of a parcel post carton containing the egg encasing means.
Figure 15:
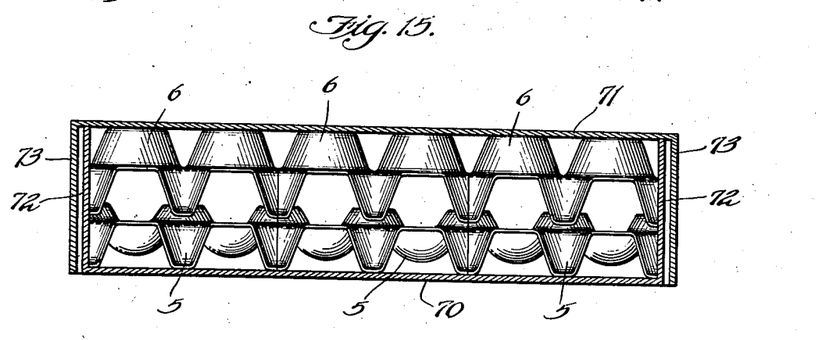
Figure 15 is a cross-sectional view through the carton in Figure 14, taken substantially along the line 15—15, looking in the direction of the arrows.

As will be seen in Figures 14 and 15, encasing means of the present invention either in the form of a one dozen carton or a three dozen filler and flat may be fitted in a relatively inexpensive corrugated paper box having a bottom section 70 which telescopes into a top 71. The flat 5 and filler 6 fit snugly within the box and when filled with eggs and the lid secured on the box, a compact package is formed. Around the edges of the package are the sidewall members 72 at the bottom section and the sidewall member 73 of the top so that the eggs are well protected. Boxes of this type are frequently made with overlapping corners as shown at 74, which overlapping portions tend to re-enforce the box to further guard the eggs against damage in shipment. The box being relatively inexpensive can be discarded with the filler and flat by the purchaser. The shipper saves the investment in a large number of relative expensive cases and the inconvenience of shipping the same back and forth is avoided.

While Figures 14 and 15 show a case for three dozen eggs, it will be apparent that by suitable proportioning, the case can be made to contain a greater or lesser number of eggs, as desired.

The egg encasing means hereinbefore described are of such configuration as to lend themselves well to manufacturing by molding from newsprint pulp or wood pulp or other suitable substance.

From the foregoing it will be apparent that the present invention is possessed of many advantages. It affords a cheap, high quality means for encasing eggs, which means may be in the form of the customary filler and flat for three dozen eggs or in fillers and flats for a lesser number. When fitted together, component parts of the means are locked against transverse and longitudinal displacement, the better to guard the eggs against damage from blows along those lines. The filler and flat may be separated to form a serviceable carton for handling eggs in less than case lots, eliminating the necessity of discarding the fillers and flats from the cases and substituting cartons for delivery to the retail trade. The embracing means may be made by molding or may be fabricated from flat stock of suitable consistency. Eggs encased in the encasing means are securely held and properly ventilated, the pockets formed being of adequate size to accommodate the largest eggs for shipment without damage, each egg supporting only its own weight. The filler may readily be removed from the flat to expose the eggs for inspection and the established practices employed in grading, sorting and inspecting eggs may be followed without disadvantage since the eggs are sufficiently exposed above the flat to permit such practices.

While I have chosen to show my invention by illustrating and describing a preferred embodiment of it, I have done so by way of example only, as there are many modifications and adaptations which can be made by one skilled in the art within the teachings of the invention.

Having thus complied with the statutes and shown and described a preferred embodiment of my invention, what I consider new and desire to have protected by Letters Patent is pointed out in the appended claims.

What is claimed is:

1. A flat and filler assembly for an egg case section comprising only five flats each comprising a planar portion with cavity forming depressions and feet depending therebelow and with bosses extending thereabove, and only five fillers each comprising a planar portion with hollow bosses extending thereabove to form inverted cavities registered with the cavities in the flats, and with feet depending therebelow and engaging the bosses on said flat to position the planar portions of the filler away from and parallel to the planar portions of the flats, the feet of the bottom one of said flats resting on the bottom of the case and the cavity forming depressions of the other flats resting on the tops of the hollow bosses of the filler beneath it with the feet of said other flats extending between and contacting the side of said hollow bosses to lock the fillers and flats together as a unit in the egg case section.

2. A carton for packing eggs to protect them enroute from the packing center to the consumer comprising, a bottom member having formed pockets for receiving and embracing approximately one-fourth of the egg adjacent to the tip thereof leaving the remainder of the egg exposed for handling, feet on said bottom member adapted to rest on the bottom of an egg case, said feet depending from the member and beyond said pockets to space the pockets away from the bottom of the egg case, a top member fitting over the remaining approximately three-fourths of the eggs and having formed pockets larger than the pockets in said bottom member, and embracing approximately one-fourth of the eggs at the large end thereof, and means on said bottom member in interlocking engagement with said top member to secure together said top and bottom members to form a carton, said means being independent of said egg pockets and positioned therebetween.

3. A carton for one dozen eggs adapted to fit into a standard size egg case and adapted for additional use for packing of eggs for the retail trade comprising, a generally flat bottom member, feet means depending from said member near the edges thereof, bosses in said member depending therefrom to form cavities each of which is adaptd to receive and embrace approximately one-fourth of an egg adjacent to the tip thereof, said bosses being arranged in parallel rows which extend from end to end of the member and have six bosses each, other bosses disposed between said rows and projecting upwardly from said member, a top member, bosses extending upwardly from said top member to form inverted cavities which are arranged in rows and are adapted to register with the cavities in said bottom member, a row of frusto conical feet depending from said top member on the longitudinal median line thereof, said row containing one more foot than there are cavities in said rows of cavities on said bottom member, an additional row of feet depending from said top member along each lateral edge thereof, certain ones of said feet engaging and interlocking with said upwardly projecting bosses in said bottom member to align and fix together said members, said cavities and inverted cavities together forming pockets each adapted to receive and embrace an egg and said feet extending alongside of eggs in said pockts to secure them in said carton.

4. A carton for packing eggs in shipping cases and for reuse in the subsequent delivery of the eggs to consumers comprising, a bottom having a plurality of formed cavities, each of which is adapted to receive an egg and to embrace approximately one-fourth of the egg adjacent to the tip thereof leaving the rest exposed for commercial handling, feet means on said bottom member adapted to rest on the bottom of a shipping case, said feet depending from the member and beyond said cavities to space the cavities away from the bottom of the shipping case, a top member having formed cavities each of which is larger than the bottom member cavities and is adapted to receive an egg and to embrace approximately one-fourth thereof, and means including cooperating interlocking members on said top and bottom members for registering each cavity in the top member with a corresponding cavity in the bottom member and for securing the two members together in spaced apart relation thereby to form a carton having a plurality of pockets each adapted to receive and embrace an egg.

5. Means for encasing eggs in a standard egg case in individual pockets comprising, top and bottom members, a plurality of egg cups in said bottom member, which cups are arranged in parallel rows and are uniformly spaced in said rows, said cups being shaped to engage approximately one-fourth of the tip portions of eggs to support them in upright rows on the member, posts extending above said member between said rows of eggs, said posts terminating below the middles of eggs in said cups, a socket formed in the upper end of each of said posts, a plurality of inverted cups in said top member arranged in parallel rows and spaced in said rows to register with the cups in said bottom member, said inverted cups being shaped to engage approximately one-fourth of the large ends of the eggs in said cups, and feet on said top member adapted to register with and project into said sockets in said posts to lock the two members together.

6. A filler and flat combination for encasing eggs in individual pockets in a standard egg case comprising, a flat having cavities for supporting the eggs in spaced apart upright rows with the tip ends of the eggs lowermost, said cavities being arranged to leave approximately three-fourths of the egg exposed above the cavity to permit commercial handling of the eggs, said cavities being shaped to engage and support the eggs sufficiently securely to permit moving the flat and eggs in and out of an egg case as a unit, a filler having inverted cavities which are larger than the cavities in said flat and are adapted to fit over and cover approximately one-fourth of the exposed portions of the eggs, means on said filler and flat for spacing the two apart so as to leave the sides of the combination largely open to permit free circulation of air around the eggs, said latter means including a socket in said flat and a tennon on said filler fitted therein for holding the filler and flat together.

7. Means for encasing eggs in a standard egg case in individual pockets comprising, top and bottom members, a plurality of egg cups in said bottom member which cups are arranged in parallel rows and are uniformly spaced in said rows, said cups being shaped to engage approximately one-fourth of the tip portions of eggs to support them in upright rows on the member, posts extending above said member between said rows of eggs, said posts terminating in a plane through said eggs at points approximately one-third of the distance from the tip to the large ends of the eggs, an inverted frusto conical socket formed in the upper end of each of said posts and extending downwardly therein, a plurality of inverted cups in said top member arranged in rows and spaced therein to register with the cups in said bottom member, said inverted cups being shaped to engage approximately one-fourth of the large ends of the eggs in said cups, and inverted frusto conical feet on said top member projecting therebelow and adapted to register with and project into said frusto conical sockets in said posts to space the two members apart and to lock the same together.

8. Means for encasing eggs in individual pockets in a standard egg case adapted to fit with other similar means in a section of said case to support fifteen dozen eggs therein comprising, a bottom member having a planar upper surface, egg cups depressed in said surface and arranged in parallel rows and uniformly spaced in the rows, said cups being of such dimension as to engage approximately one-fourth of the tip ends of eggs, feet depending from said surface and below said egg cups, posts extending upwardly from said surface and terminating in a plane that is parallel to said surface and disposed below the centers of eggs in said cups to permit commercial handling of the eggs, fractional posts extending upwardly from said surface around the edges of said member, sockets in said posts, a top member comprising, a plurality of inverted egg cups arranged in parallel rows and uniformly spaced in the rows, said cups being of such dimension as to engage approximately one-fourth of the top portions of eggs in the cups in said bottom member, feet on said top member engaging in sockets in said posts and fractional posts to space the top member with respect to the bottom member, and to lock the two members together, said inverted cups having flat tops upon which the cups of a bottom member rest to support the bottom member thereon and having tapered sides engaged by the feet of a bottom member to lock the two members together against relative lateral movement.

JESSE R. GRANT.